United States Patent
Yu

(10) Patent No.: US 8,500,047 B2
(45) Date of Patent: Aug. 6, 2013

(54) METHOD OF REMOVING BACKING ADHESIVE OF CARPET AND THE DEVICE THEREOF

(76) Inventor: Chengjin Yu, Guangdong (CN)

(*) Notice: Subject to any disclaimer, the term of this patent is extended or adjusted under 35 U.S.C. 154(b) by 24 days.

(21) Appl. No.: 13/128,637

(22) PCT Filed: Nov. 14, 2008

(86) PCT No.: PCT/CN2008/001875
§ 371 (c)(1),
(2), (4) Date: May 10, 2011

(87) PCT Pub. No.: WO2010/054502
PCT Pub. Date: May 20, 2010

(65) Prior Publication Data
US 2011/0220293 A1  Sep. 15, 2011

(51) Int. Cl.
*B27L 11/00* (2006.01)

(52) U.S. Cl.
USPC ..... 241/14; 241/24.12; 241/24.18; 241/24.28

(58) Field of Classification Search
USPC ............... 241/14, 24.12, 24.18, 24.19, 24.28, 241/DIG. 38
See application file for complete search history.

(56) References Cited

U.S. PATENT DOCUMENTS

| | | | | |
|---|---|---|---|---|
| 2,803,618 A * | 8/1957 | Harvey | 528/227 |
| 3,657,997 A * | 4/1972 | Vellella | 100/39 |
| 5,230,473 A * | 7/1993 | Hagguist et al. | 241/3 |
| 5,497,949 A * | 3/1996 | Sharer | 241/76 |
| 5,518,188 A * | 5/1996 | Sharer | 241/14 |
| 5,535,945 A * | 7/1996 | Sferrazza et al. | 241/24.12 |
| 6,059,207 A * | 5/2000 | Costello et al. | 241/24.12 |
| 6,176,769 B1 * | 1/2001 | Suzuki et al. | 451/443 |
| 6,398,138 B1 * | 6/2002 | Robinson et al. | 241/5 |
| 6,752,336 B1 * | 6/2004 | Wingard | 241/20 |
| 6,776,873 B1 * | 8/2004 | Sun et al. | 156/345.41 |
| 7,267,741 B2 * | 9/2007 | Ren | 156/345.1 |
| 7,413,504 B2 * | 8/2008 | Lytinas | 451/67 |
| 2008/0176494 A1 * | 7/2008 | Palushaj | 451/353 |

* cited by examiner

*Primary Examiner* — Mark A Osele
*Assistant Examiner* — Nickolas Harm
(74) *Attorney, Agent, or Firm* — George G. Wang; Bei & Ocean

(57) ABSTRACT

A method and a device for removing backing adhesive, typically a mixture of $CaCO_3$ 3 and SBR, from a carpet. The method includes: (a) sorting the carpets into different categories according to the materials from which the fibers of the carpets are made; (b) removing the bottom layer from a sorted carpet; and (c) removing the backing adhesive by grinding it off the carpet with a grinder until all the adhesive is removed and the fibers of the carpet become loss, which is then collected for recycle. The device is specifically designed to perform the above method and includes a grinder, a feeding device and a pressing wheel device on a frame. The feeding device has an active roller and a passive roller positioned on a support base. The active roller adjoins the grinding wheel and the passive roller presses against the active roller; and the pressing wheel device comprises a pressing wheel roller provided on the framework support base and adjoining the grinding wheel, and a spring pressing position defining mechanism for pushing the pressing wheel roller to a prescribed distance from the grinding wheel.

3 Claims, 4 Drawing Sheets

METHOD OF REMOVING BACKING ADHESIVE OF CARPET AND THE DEVICE THEREOF

FIELD OF THE INVENTION

The present invention relates to a method for removing backing adhesive, typically a mixture of $CaCO_3$ and styrene-butadiene rubber from a carpet, and it further relates to a device specifically used for performing the method.

BACKGROUND OF THE INVENTION

Recycling of waste carpets has always been a problem confronting governments and environmental protection agencies worldwide, and the problem of recycling waste carpets lies mainly in separating fiber from backing adhesive, which typically is a mixture of $CaCO_3$ and styrene-butadiene rubber (hereinafter SBR).

A carpet is usually composed of the fiber on a polypropylene (hereinafter PP) woven framework, a PP mesh on the bottom layer, and a mixture of $CaCO_3$ and SBR in the middle. The mixture of $CaCO_3$ and SBR are entirely adhered to the U-shaped root of the fiber. This brings about great difficulty in the recovery of useful fiber of the carpet.

Many companies have conducted a great deal of research in this respect, but no satisfactory solutions have been found so far. One example is disclosed in a patent application titled "Process for Recovery of Caprolactam from Waste Containing Nylon" filed in China in 1996 by DSM N. V. of Netherlands and published by the Chinese Patent Gazettes with a publication number of CN1196048. It solves the problem of recovering caprolactam from the waste containing nylon mainly by a chemical depolymerizing method. This method demands a large amount of investment and produces however no significant economic return.

In the prior art, there are mainly two methods for separating carpet fiber from the mixture of $CaCO_3$ and SBR. One is dissolving SBR with a chemical solvent after shredding the carpet and then washing $CaCO_3$ off by water. However, this method may severely pollute the environment and thus has not be widely accepted. The other method is shearing the fiber from the carpet with wool shears, but this method is low in both processing efficiency and recovery rate, and the output thereof is very poor.

SUMMARY OF THE INVENTION

The first object of the present invention is to provide a method which requires a small amount of investment and has a high processing efficiency and recovery rate, and which can separate the carpet fiber from the backing adhesive adhered to the fiber root in a simple and effective manner, and transform the backing adhesive into a powder-like substance while the carpet fiber can substantially retain its original length to facilitate separation of the two.

The method of the present invention for removing backing adhesive from a carpet comprises the following steps:

1) Removing the PP mesh base on the bottom layer from a sorted carpet; and 2) passing the carpet with the PP mesh base removed through an active feeding device composed of a pair of counter-pressure rollers, the surface with the backing adhesive being fed to a grinding wheel of a grinder which grinds the backing adhesive and/or a portion of the PP woven framework into powder. The step is further described in the following.

The pair of counter-pressure rollers of the active feeding device is respectively a active roller and a passive roller. The distance between the active roller and the grinding surface of the grinding wheel of the grinder, is within the range between 2 mm and 10 mm, inclusive.

After primary grinding by the grinding wheel of the grinder, a pressing wheel device with a roller is further provided to press the carpet on the grinding surface of the grinding wheel of the grinder for further grinding until the backing adhesive is completely ground into powder. The distance between the roller of the pressing wheel device and the grinding surface of the grinding wheel of the grinder is within the range between 2 mm and 10 mm, inclusive.

The difference between the grinding rate of the grinding wheel of the grinder and the carpet feeding rate is greater than or equal to 500 m/m and smaller than or equal to 2500 m/m, and the grinding wheel of the grinder is preferably made of silicon carbide and provided with air holes. The rotation rate of the grinding wheel is greater than or equal to 500 r/m and smaller than or equal to 2500 r/m, and the outer diameter of the grinding wheel is greater than or equal to 200 mm and smaller than or equal to 600 mm.

The method for removing backing adhesive from a carpet of the present invention has the following advantages:

1. Compared with the method of shearing the fiber on the carpet with wool shears, the processing method in the present invention is more effective, which greatly increases the processing speed.

2. Compared with the method of dissolving SBR with an organic solvent, the present invention is completely environmental friendly and does not produce secondary pollution.

3. The present invention is simple in operation and low in failure rate and automated production thereof can be easily realized.

The present method solves the problem of removing the mixture of $CaCO_3$ and SBR from the carpet which has been an difficult issue for years and it advances the efforts for reducing carpet landfilling and encouraging carpet recycling.

Of course, the present invention is merely a link in the whole carpet recycling system, and it takes other processes to separate the various substances in the carpet completely and transform them into renewable resources.

Another object of the present invention is to provide a device specifically used for implementing the above method of removing backing adhesive from a carpet. The device is further described below.

A grinder, a feeding device and a pressing wheel device are provided on a frame, wherein the feeding device comprises: an active roller and a passive roller provided in a framework support base with parallel rotation axes and adjoining each other, wherein the active roller is fixed and adjoins a grinding wheel of a grinder, and the passive roller is slidably supported on a guiding rail of the support base by a bearing and is provided with a spring pressing mechanism for pushing the passive roller to the active roller. The pressing wheel device comprises: a roller provided in a framework support base whose rotation axis is parallel with the axis of the grinding wheel of the grinder, wherein the roller adjoining the grinding wheel of the grinder is slidably supported on a guiding rail of the support base by a bearing and is provided with a spring pressing position defining mechanism for pushing the pressing wheel roller to a prescribed distance from the grinding wheel of the grinder.

The active roller bearing is a T bearing of the prior art, and the spring pressing mechanism comprises is a slide bar provided on the T bearing, and a compression spring mounted in the middle of the slide bar, wherein the end of the slide bar extends out through a guiding hole of the framework support base.

The pressing wheel device bearing is a T bearing of the prior art, and the spring pressing position defining mechanism comprises a screw provided on the T bearing, and a compression spring mounted in the middle of the screw, wherein the end of the screw extends out through the framework support base with a nut screwed thereon.

The present invention can be further improved on the aforesaid basic principle.

A feed guide plate is provided after the feeding device; the roller of the pressing wheel device is rotated by the active roller via a chain wheel and a chain or a pulley and a belt; a protective cover is mounted over the grinding wheel, and a dust outlet is opened on the top of the protective cover; a hopper is provided under the grinding wheel and a conveyor belt is provided under the hopper.

The active roller drives the passive roller through gear transmission.

The device of the present invention requires a small investment and has high processing efficiency and high recovery rate, which can transform the backing adhesive adhered to the fiber root into powder in a simple and effective manner, and can substantially retain the original length of the fiber on the carpet to facilitate the separation of the two.

In the figures: 1—grinding wheel of the grinder, 2—feeding device, 3—pressing wheel device, 4—support base, 5—active roller, 6—passive roller, 7—T bearing, 8—slide bar, 9—compression spring, 10—screw, 11—nut, 12—feed guide plate, 13—chain wheel, 14—chain, 15—protective cover, 16—dust outlet, 17—hopper, 18—conveyor belt, 19—gear pair, 20—woven framework, 21—fiber, 22—PP mesh, 23—backing adhesive, 24—carpet, 25—pressing wheel roller, and 26—frame.

DETAILED DESCRIPTION OF PARTICULAR EMBODIMENTS OF THE INVENTION

Figure 4:
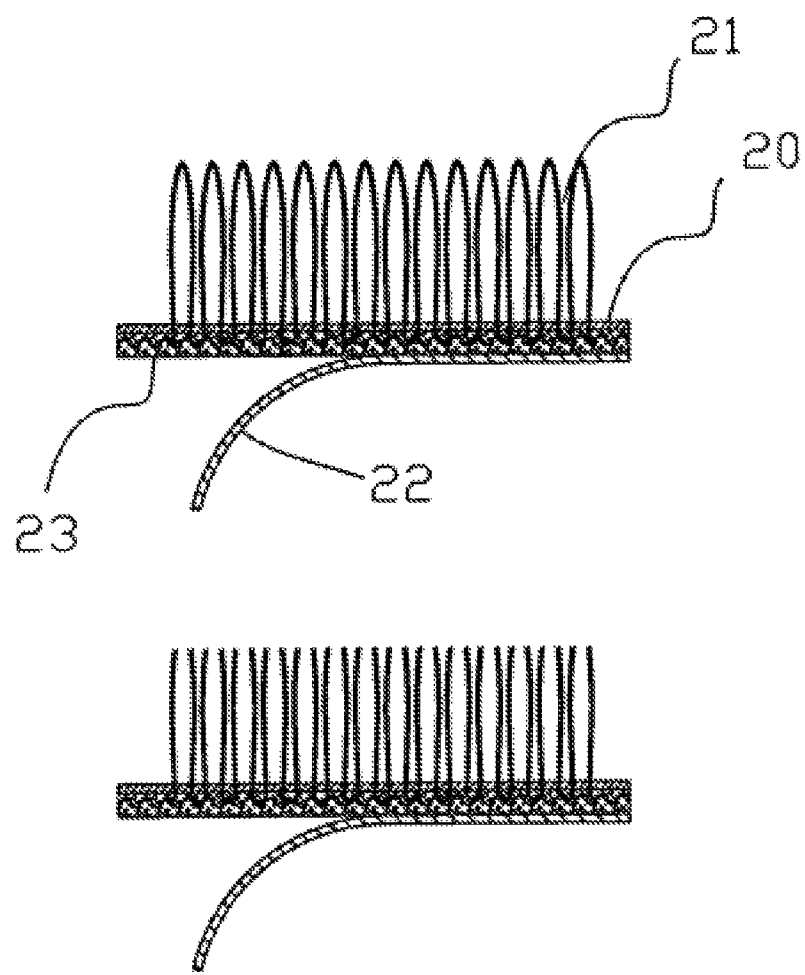
FIG. 4 is a schematic diagram of the structures of two types of carpet.

FIG. 4 shows two common carpet structures known in the prior art. They comprise: fiber (21) woven on the PP woven framework (20), a PP mesh (22) on the bottom layer and backing adhesive (23) (a mixture of $CaCO_3$ and SBR) in the middle, wherein the mixture of $CaCO_3$ and SBR is entirely adhered to the U-shaped root of the fiber.

The method for removing backing adhesive from a carpet of the present invention comprises the following steps:

1) Removing the PP mesh on the bottom layer from sorted carpet; and

2) Passing the carpet with the PP mesh base removed through an active feeding device composed of a pair of counter-pressure rollers, and orienting the carpet without the bottom layer so that the surface adhered with the backing adhesive being fed to a grinder which grinds the backing adhesive into powder. The method is described further in the following.

Sorting refers to sorting the collected waste carpet into four types according to the types of the surface fiber materials, which are mainly nylon, PP, PET and wool.

The difference between the grinding rate of the grinding wheel of the grinder and the feeding rate is greater than or equal to 500 m/m and smaller than or equal to 2500 m/m, and the grinding wheel of the grinder is preferably made of silicon carbide and provided with air holes to facilitate grinding; the rotation rate of the grinding wheel of the grinder is greater than or equal to 500 r/m and smaller than or equal to 2500 r/m, and the outer diameter of the grinding wheel is greater than or equal to 200 mm and smaller than or equal to 600 mm.

The pair of counter-pressure rollers of the feeding device is respectively a active roller and a passive roller, the pressing force between the active roller and the passive roller is provided by a spring, and the motive power is transmitted by a gear pair to ensure that the feedstock does not slip; and the distance between the active roller and the grinding surface of the grinding wheel is greater than or equal to 2 mm and smaller than or equal to 10 mm.

A pressing wheel device may be further provided, and after primary grinding by the grinding wheel of the grinder, the carpet is pressed on the grinding surface of the grinding wheel of the grinder for further grinding until the backing adhesive is completely ground into powder, wherein the distance between a roller of the pressing wheel device and the grinding surface of the grinding wheel is greater than or equal to 2 mm and smaller than or equal to 10 mm, and the carpet comes loose when being ground to the PP woven framework layer which indicates that the backing adhesive is completely ground off.

After the aforesaid steps, the backing adhesive on the carpet, i.e. the mixture of $CaCO_3$ and SBR, can be completely separated from the carpet fiber which can be recycled.

Figure 1:
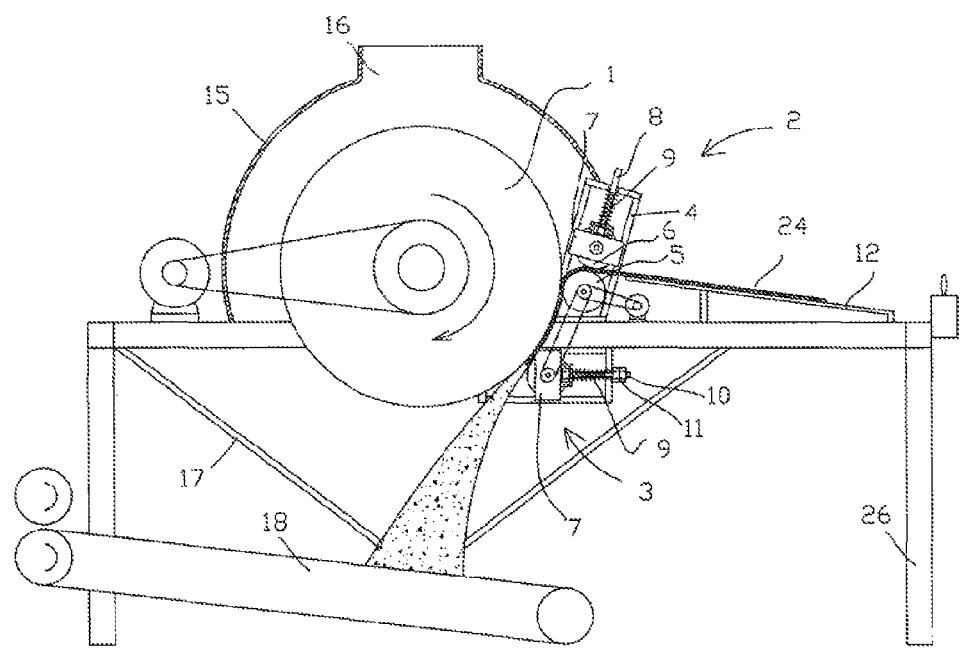
FIG. 1 is a schematic diagram showing the structure and principle of an embodiment of the device of the present invention with a partial cross-sectional view thereof.
Figure 2:
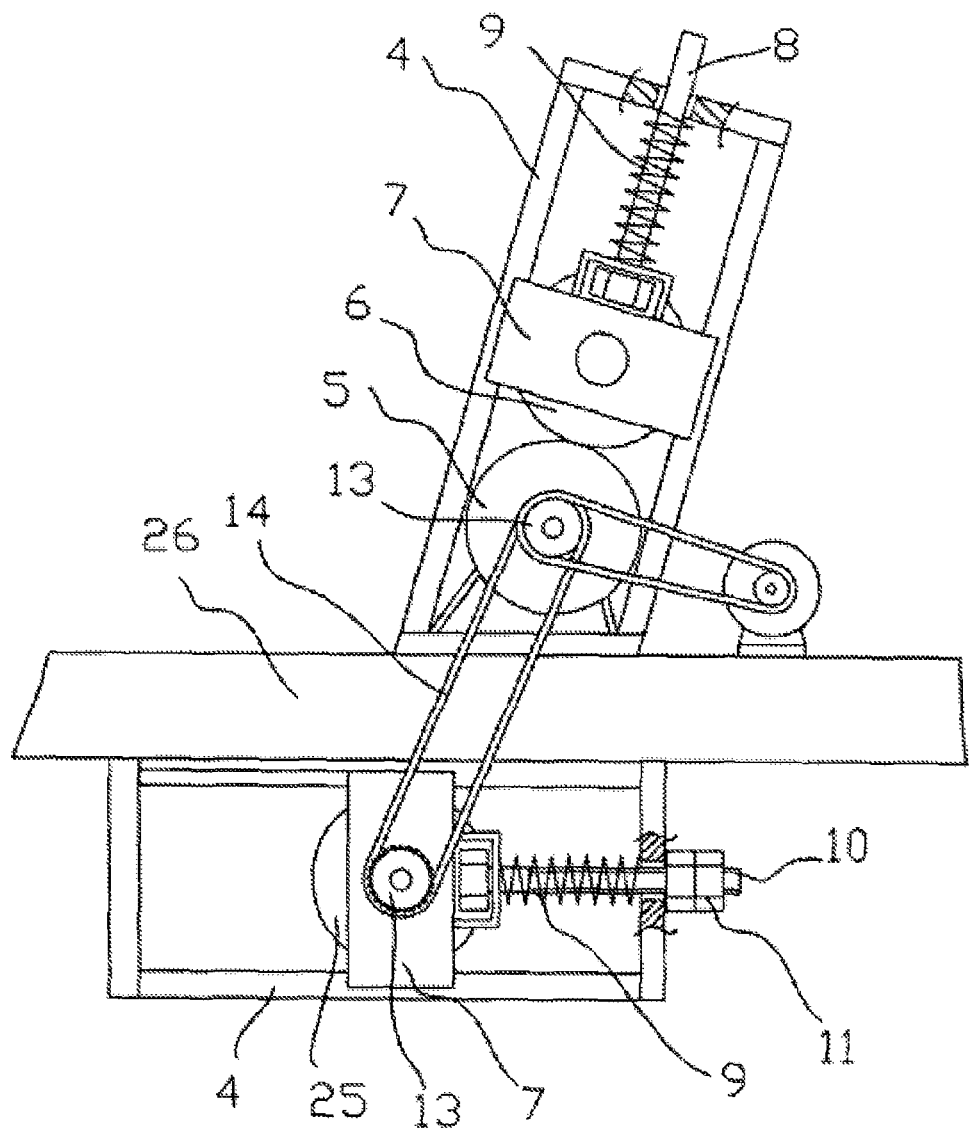
FIG. 2 is a schematic diagram showing the structure and principle of the feeding device and the pressing wheel device in the embodiment of the device shown in FIG. 1.
Figure 3:
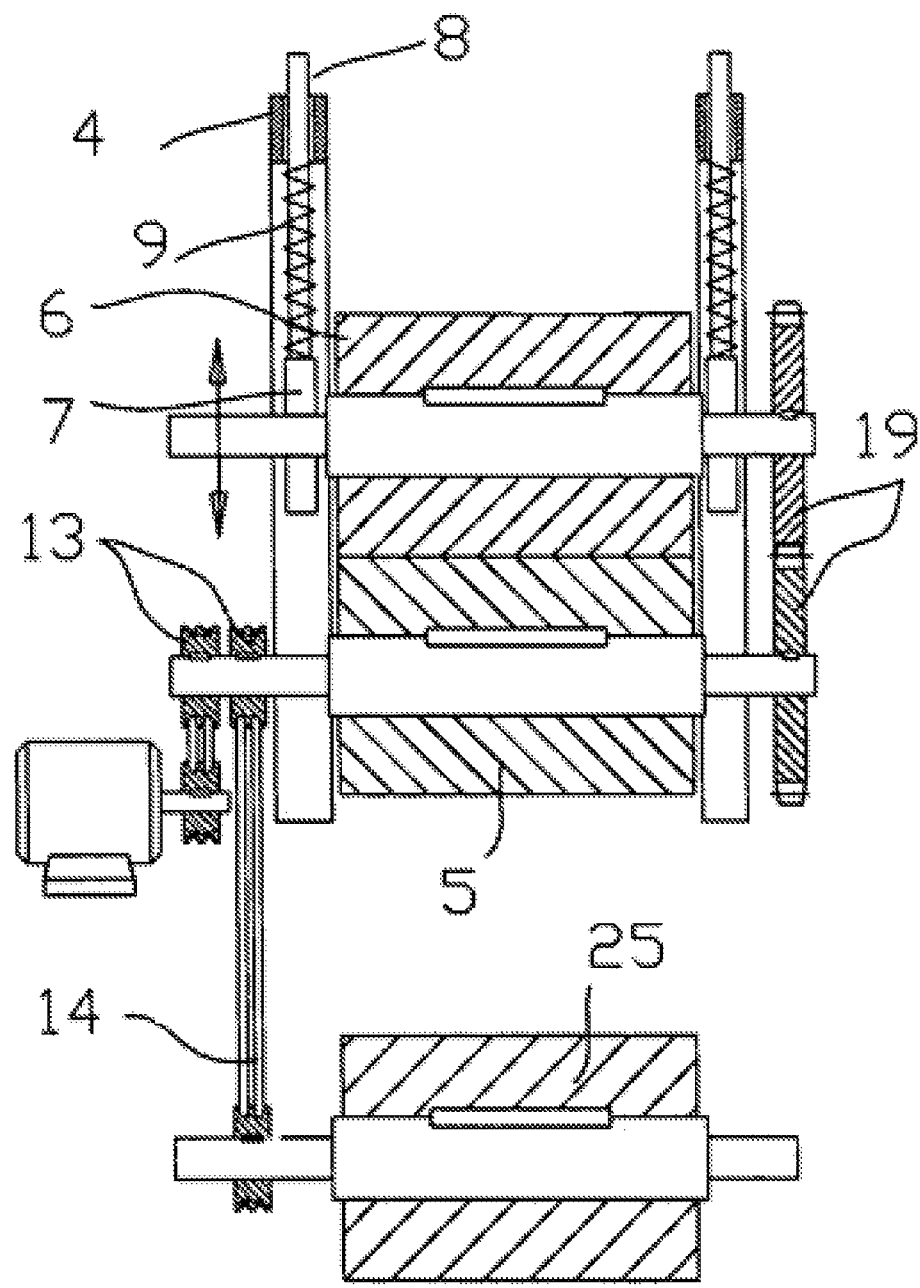
FIG. 3 is a schematic diagram showing the transmission relationship between the feeding device and the pressing wheel device in the embodiment of the device shown in FIG. 2.

The structures of the embodiments of the device specifically designed for the aforesaid method for removing backing adhesive from a carpet in the present invention and satisfying the requirements thereof are shown in FIG. 1 through 3:

A grinder, a feeding device 2 and a pressing wheel device 3 are provided on a frame 26, wherein the feeding device comprises: a active roller 5 and a passive roller 6 provided in a framework support base 4 with parallel rotation axes and adjoining each other. Of course, the rotation axes of the two rollers are parallel with each other and with the axis of the grinding wheel of the grinder, wherein motive power is transmitted between the active roller 5 and the passive roller 6 through a gear pair 19, and the two rollers rotate in opposite directions, and a driving motor and a decelerator of the active roller are not shown in the figures.

When the grinding wheel rotates clockwise, it cannot turn back, otherwise, the grinding wheel will come off. The active roller 5 is fixed on the frame and adjoins the grinding wheel 1 of the grinder, wherein the distance between the active roller 5 and the grinding surface of the grinding wheel 1 is greater than or equal to 2 mm and smaller than or equal to 10 mm.

The passive roller 6 in the present embodiment is slidably supported on a guiding rail of a support base 4 via a T bearing 7 in the prior art. A slide bar 8 is provided on the T bearing 7 and a compression spring 9 is mounted in the middle of the slide bar 8. The end of the slide bar 8 extends out through a guiding hole of the framework support base and is slidable within the guiding hole, and the compression spring 9 pushes the passive roller 6 towards the active roller 5 such that the two rollers press the carpet 24 from both sides and transmit it to the grinding wheel 1 of the grinder.

A tumbler switch is mounted on the driving motor of the active roller to facilitate the forwarding and withdrawing of the carpet material.

The support base 4 can be fixed on the frame via an elongated mounting hole such that the position of the support base 4 relative to the grinder can be adjusted to ensure that the distance between the active roller 5 and the grinding surface of the grinding wheel 1 meets the requirement.

A pressing wheel device with a roller is further provided, and after grinding by the grinding wheel of the grinder, the carpet is pressed on the grinding surface of the grinding wheel of the grinder, wherein the pressing wheel device in the present embodiment comprises: a pressing wheel roller 25 provided in a framework support base 4 whose rotation axis is parallel with the axis of the grinding wheel of the grinder and which adjoins the grinding wheel 1 of the grinder, and is also slidably supported on a guiding rail of the support base 4 by a T bearing in the prior art, a screw 10 provided on the T bearing, and a compression spring 9 mounted in the middle of the screw, wherein the end of the screw 10 extends out through the framework support base with a nut 11 screwed in; the roller of the pressing wheel device is rotated by the active roller 5 via a chain wheel 13 and a chain 14.

The compression spring pushes the pressing wheel roller towards the grinding wheel of the grinder, and the nut 11 at the end of the screw 10 retains a prescribed distance between the pressing wheel roller and the grinding wheel of the grinder and adjusts the distance.

A feed guide plate 12 is provided after the feeding device to facilitate placement of the carpet upside down into the feeding mechanism to avoid accidents; a protective cover 15 is mounted over the grinding wheel 1, and a dust outlet 16 is opened on the top of the protective cover for removing the dust produced in the grinding process; a hopper 17 is provided under the grinding wheel mainly for collecting the carpet fiber after grinding and serving a protective function, and a conveyor belt 18 is mounted under the hopper 17. The conveyor belt is driven by a separate motor and a reduction gearbox, and the driving mechanism of the conveyor belt is not shown in the figures.

A roller is further pressed at an exit of the conveyor belt 18, and since the protective cover is mounted all around the frame 26, the safety and airtightness of the machine can be ensured and meanwhile an effective delivery of the ground carpet can also be ensured.

What is claimed is:

1. A method for removing backing adhesive from a carpet, comprising:
    (a) sorting waste carpets to be processed according to the type of the material from which the surface fiber of a carpet is made;
    (b) removing a bottom layer from the carpet and orienting the carpet without the bottom layer so that backing adhesive is exposed on a surface which becomes a surface with backing adhesive;
    (c) feeding the carpet without the bottom layer with a feeding device into a grinding device equipped with a grinding wheel having a grinding surface so that the surface with backing adhesive is facing the grinding surface to perform a primary grinding; and
    (d) recovering fibers which come loose from the carpet; wherein the grinding wheel is made of silicon carbide with an outer diameter between 200 mm and 600 mm and is set at a speed between 500 r/m and 2500 r/m.

2. The method according to claim 1, where the feeding device comprises a pair of counter-pressure rollers, being a active roller and a passive roller, respectively and the distance between the active roller and the grinding surface of the grinding wheel is between 2mm and 10mm.

3. The method according to claim 2, further comprising a secondary grinding step in which a pressing wheel device having a roller is used to press the carpet coming off the primary grinding against the grinding surface of the grinding wheel to further grind the backing adhesive of the carpet, wherein the distance between the roller of the pressing wheel device and the grinding surface of the grinding wheel is between 2mm and 10mm.

\* \* \* \* \*